US005259635A

United States Patent [19]

Picker

[11] Patent Number: 5,259,635

[45] Date of Patent: Nov. 9, 1993

[54] WHEELCHAIR

[75] Inventor: Patrick Picker, Rock Forest, Canada

[73] Assignee: Sherwood Drolet Corporation Ltd, Canada

[21] Appl. No.: 438,183

[22] Filed: Nov. 20, 1989

[30] Foreign Application Priority Data

Sep. 29, 1989 [CA] Canada .................................. 614605

[51] Int. Cl.[5] ......................... A61G 5/02; B62D 7/08; B62M 1/14

[52] U.S. Cl. .................................. 280/250.1; 280/94; 280/304.1; 280/650

[58] Field of Search ................. 280/250.1, 304.1, 650, 280/94; 267/150

[56] References Cited

U.S. PATENT DOCUMENTS

| | | | |
|---|---|---|---|
| Re. 32,242 | 9/1986 | Minnebraker | 280/250.1 |
| 734,202 | 7/1903 | Tromble | 280/94 |
| 759,090 | 5/1904 | Gardner | 280/94 |
| 1,100,713 | 6/1914 | Colson | 280/94 |
| 3,848,885 | 11/1974 | Hefren | 267/150 |
| 4,166,631 | 9/1979 | Sanaski | 280/250.1 |
| 4,313,613 | 2/1982 | Worsham | 280/94 |
| 4,500,102 | 2/1985 | Haury et al. | 280/304.1 |
| 4,592,570 | 6/1986 | Nassiri | 280/650 |
| 4,709,939 | 12/1987 | Stewart | 280/94 |
| 5,028,064 | 7/1991 | Johnson | 280/250.1 |

OTHER PUBLICATIONS

Experimental use as discussed in attached Memorandum.

*Primary Examiner*—Mitchell J. Hill
*Attorney, Agent, or Firm*—Larson and Taylor

[57] ABSTRACT

A wheelchair for competition use comprising a steerable front wheel assembly with a return mechanism to keep the wheel assembly in dead centre in absence of steering command. The rear axle of the wheelchair includes articulated connections to perform camber adjustments without changing ride height and spacing between the rear wheels.

14 Claims, 15 Drawing Sheets

WHEELCHAIR

FIELD OF THE INVENTION

The present invention relates to a vehicle and, more particularly, to a wheelchair for competition use. More specifically, the invention concerns a wheel assembly for steering the wheelchair, an improved chassis construction for a wheelchair and a system to adjust the camber of a wheelchair wheel.

BACKGROUND OF THE INVENTION

A conventional racing wheelchair has a steel tubing chassis to which are mounted two rear wheels and a front axle with one or two wheels. A seat is provided in the chassis for accomodating the driver.

The various components of conventional wheelchairs for competition use are very similar to those used for the construction of ordinary wheelchairs. Consequently, conventional racing wheelchairs are very difficult to adjust to suit various driver body sizes and are also relatively heavy. In addition, conventional racing wheelchairs do not use wheels with a steering capability which is a major drawback.

OBJECTS AND STATEMENT OF THE INVENTION

A general object of the invention is to provide an improved wheelchair well suited for competition use.

Another object of the invention is to provide a wheel assembly that can be used to steer a wheelchair.

A further object of the invention is to provide an improved camber angle adjustment system for a wheelchair wheel.

Another object of the invention is a chassis for a wheelchair which is relatively light, yet rigid.

The concepts developed under the invention are not necessarily limited to the construction of racing wheelchairs but may also be applied for the construction of ordinary wheelchairs and to other types of vehicles as well.

In one aspect, the invention provides a wheel assembly which can be used to steer a racing wheelchair. The wheel assembly comprises a cross-member to which is mounted a wheel mechanism. More particularly, the wheel mechanism includes a wheel rotatably mounted to an axle, the latter being retained to the cross-member by means of a pivotal connection which allows to vary the angle of the wheel mechanism with respect to the cross-member to achieve a steering function.

The wheel assembly also incorporates a return mechanism, preferably acting on the axle, to urge the wheel mechanism into a predetermined angular position with respect to the cross-member, such as dead centre for example, allowing the vehicle to run in a straight line in absence of steering command.

In a preferred embodiment, the wheel assembly comprises a manual actuator acting on the wheel mechanism through a linkage to change the angle between the wheel mechanism and the cross-member for steering the vehicle. Under this embodiment, the return mechanism is incorporated in the linkage and comprises a resilient cam member with two camming surfaces. A cam guide adapted to ride on the camming surfaces is mounted to the cross-member. When the wheel mechanism is in a neutral position, such as dead centre, the cam guide is locked between the two camming surfaces and the assembly is at rest. However, if one changes the position of the wheel mechanism with respect to the cross-member by acting on the manual actuator, the cam guide will cause the cam member to yield through a sliding contact with either one of the two camming surfaces depending upon the direction in which the wheel mechanism is turned. The resiliency of the cam member will urge the wheel mechanism toward the neutral position, in which the cam guide is locked between the two camming surfaces. Therefore, when the manual actuator is released, the linkage coupling the actuator to the wheel mechanism will automatically return the wheel mechanism to the dead centre position.

The above described wheel assembly is particularly advantageous because it is lightweight, sturdy, and is steerable with an accurate return mechanism. It is well suited as a front wheel assembly for a racing wheelchair used on a road course where an infinitely variable steering within limits is highly advantageous. For an oval track where the curves between the straights are all the same, an advantage may be gained by providing the wheel assembly with an actuator moveable between two positions to obtain a predetermined deviation angle of the wheel mechanism from dead centre or any other neutral position as the case may be. In a preferred embodiment, this actuator is in the form of an elongated rod slidingly mounted to the cross-member and being coupled to the cam guide of the return mechanism to rotate the cam guide as the elongated bar slides. The cam guide is an eccentric so when it rotates it will cause the cam member to yield. In turn, a limited angular displacement will be imparted to the wheel mechanism. It should be appreciated that this limited angular displacement is achieved solely by virtue of the resiliency of the cam member, therefore the steering capability of the wheel assembly is retained at all times.

In another general aspect, the invention provides a chassis for a wheelchair, preferably for competition use, comprising two main rails extending along the longitudinal axis of the wheelchair and supporting the various components thereof, namely the front and rear wheel assemblies and a rigidifying framework. Preferably, the rigidifying framework includes two top beams extending side by side along substantially the entire length of the wheelchair and being crossed at the rear end of the wheelchair. A plurality of support members are used to interconnect the top beams to the main rails. The connection between the various components of the chassis is carried out by means of clamps made of plastic material, tightened by a fastener, such as a bolt. This attachment system is advantageous because it allows to easily adjust the position of the various members with respect to one another simply by loosening the clamps and sliding them to the desired position. In addition, some of the chassis members are made adjustable in length.

In a further general aspect, the invention provides an improved articulation system to allow the camber angle of the wheel to be varied without changing the ride height of the vehicle nor changing the horizontal position of the top wheel portion. Herein, the term "camber" designates the angle that is defined between the imaginary reference plane of the wheel and the ground surface, and it does not imply that the wheel is necessarily steerable.

In a preferred embodiment, this articulation system is used on the rear axle assembly of the wheelchair which comprises a cross-member mounted to the chassis of the wheelchair and supporting at each extremity a fork member carrying a respective wheel of the rear axle assembly. Each fork member moves on the rear cross-member in patterned guide slots which allow to change the camber of each rear wheel without altering the ride height of the wheelchair nor the horizontal position of the top portion of the wheel, in other words, as the camber angle changes, the bottom extremity of the wheel moves along a substantially horizontal line and the top extremity moves along a vertical line. This feature is particularly advantageous because it allows to easily change the camber angle of a wheel without altering the toe in or the other settings of the wheelchair.

In summary, the invention comprises a combination for use with a vehicle, comprising:

- a cross-member;
- a wheel assembly, including:
  - a) an axle pivotally mounted to the cross-member; and
  - b) a wheel rotatably mounted to the axle, a pivotal movement of the axle allowing to vary the angular relationship between the wheel assembly and the cross-member; and
- wheel assembly return means cooperating with the wheel assembly for urging the latter toward a predetermined angular position with respect to the cross-member.

The invention also extends to a wheelchair frame, comprising:

- a pair of main rails extending side-by-side;
- a pair of upwardly extending beam members, each beam member having one end connected to a main rail at a location adjacent a front end thereof and an opposite end connected to another main rail at a location adjacent a rear end thereof, the beam members intersecting and being retained to each other at a location adjacent a rear end of the frame to form a cross-like structure;
- a driver seat between the elongated beam members above the main rails and in front of the cross-like structure.

The invention further comprises in combination:

- a vehicle wheel;
- a supporting structure;
- an articulation connecting the vehicle wheel to the supporting structure, the articulation constituting means to allow a movement of the vehicle wheel relatively to the supporting structure along a predetermined path in which a bottom end of the vehicle wheel moves along a generally horizontal axis and a top end of the vehicle wheel moves along a generally vertical axis; and
- means to lock the articulation in a predetermined position.

DESCRIPTION OF A PREFERRED EMBODIMENT

Figure 1:
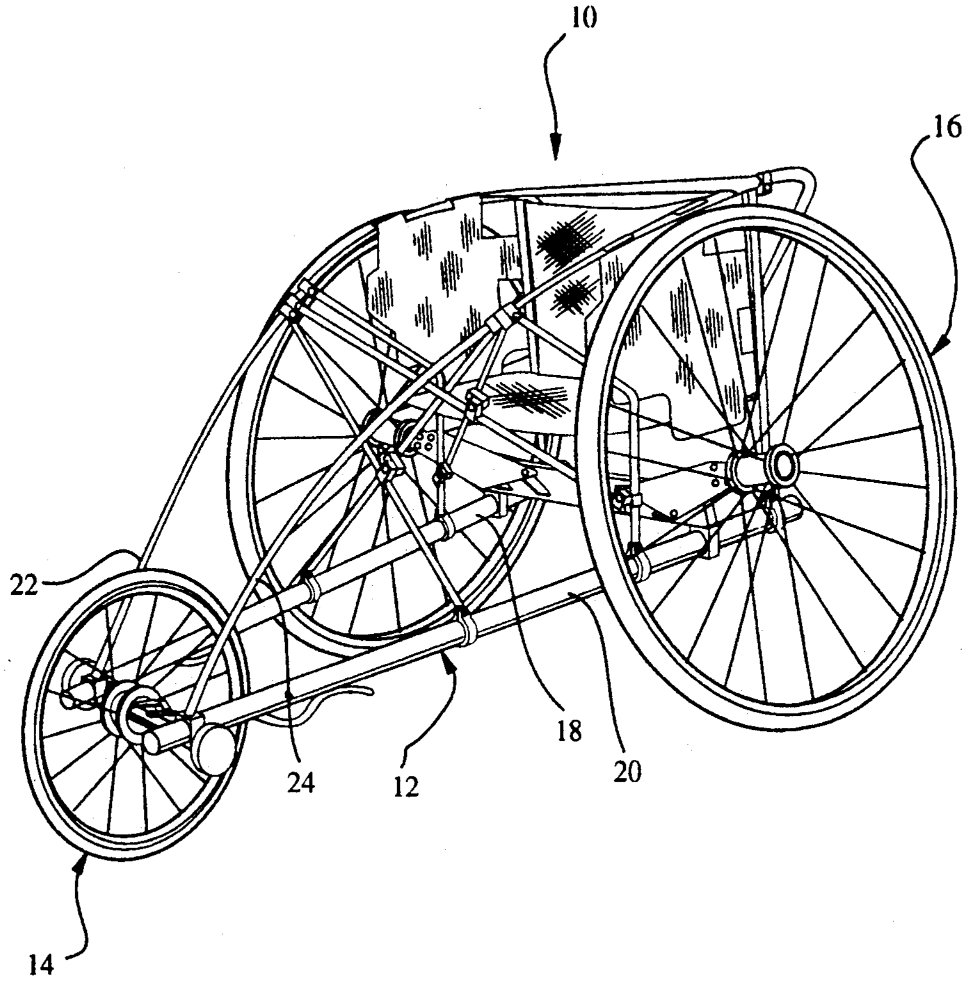
FIG. 1 is a perspective view of a racing wheelchair in accordance with the invention.
Figure 2:
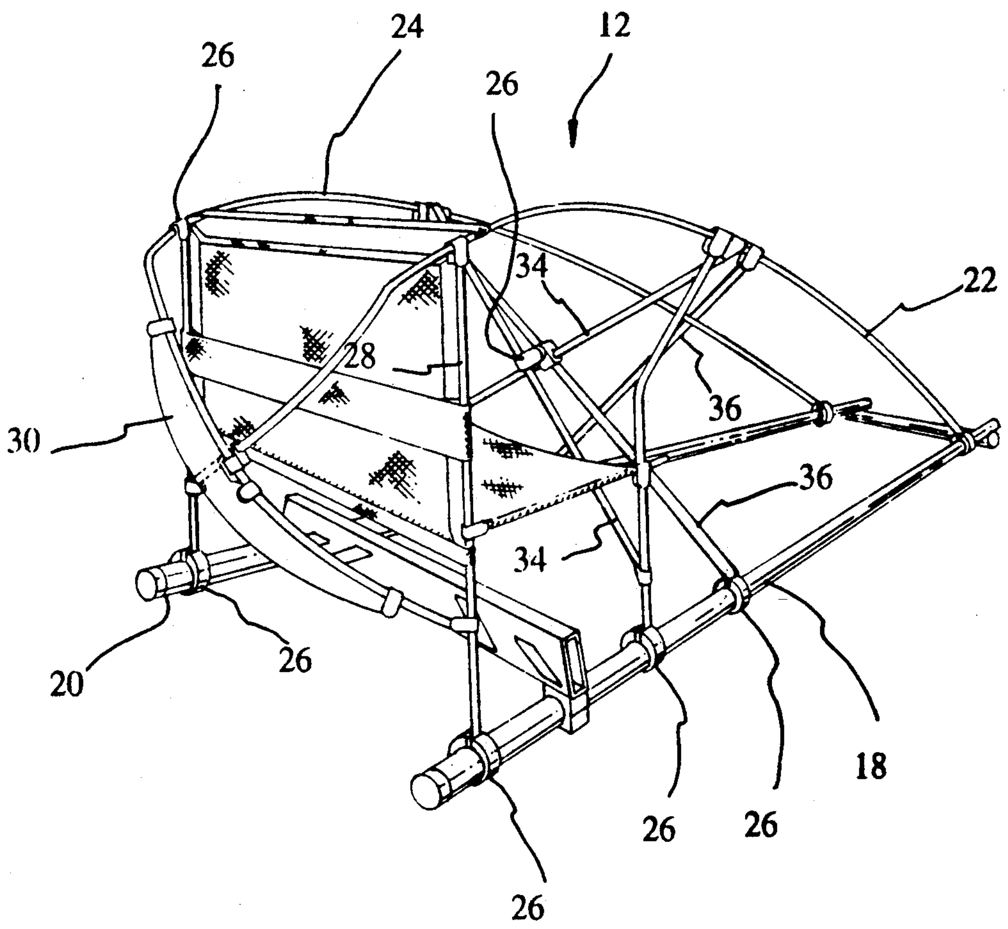
FIG. 2 is a perspective view of the wheelchair chassis from the rear.

A racing wheelchair 10 according to the invention is illustrated in FIG. 1. The wheelchair 10 comprises a chassis 12, a front wheel assembly 14 and a rear axle assembly 16.

Referring to FIGS. 2 to 6, the chassis 12 comprises two converging main rails 18 and 20 extending along the longitudinal axis of the wheelchair. Each of the main rails is made of aluminum tubing.

Two upper beams 22 and 24 extend from the rear end of the main rails 18 and 20 toward the front end thereof. More particularly, each of the beams 22 and 24 is connected to the front end of a respective main rail by means of a clamp 26 which will be described hereinafter, and extends rearwardly defining a smooth curved portion before effecting a sharp bend at the rear portion of the chassis 12. The rear extremity of a respective beam 22 or 24 is connected by means of a clamp 26 to an upwardly extending member 28 having a lower end connected to a main rail and an upper end connected to the other of the beams 22 or 24. The connection of the member 28 is carried out by means of clamps 26. It will be appreciated that this arrangement creates a cross at the rear end of the wheelchair chassis, which provides excellent rigidity characteristics. At the crossing point, the main beams 22 and 24 are retained to each other by clamps 26. To further enhance the rigidity of the structure, a plate-like member 30 is mounted to the beam 24.

The chassis 12 also comprises rigidifying members 32 bent approximately at mid-height at a certain angle interconnecting a main rail to a respective beam. A rigidifying member 34 extends from a respective beam toward the rigidifying member 32 associated with the other beam. This structure also provides a cross-like arrangement in front of the wheelchair seat, the members 34 being retained to each other at the crossing point by clamps 26. Another cross-like arrangement is created by members 36 extending in front of the members 34.

A horizontally extending member 38 extends between respective members 28 and 32. It will be appreciated that the members 28, 32 and 38 form a framework for the seat of the wheelchair.

Figure 3:
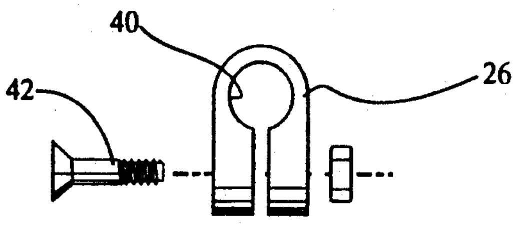
FIG. 3 is an elevational view of a clamp for interconnecting two chassis members together.

The structure of the clamp 26 is illustrated in detail in FIG. 3. The clamp comprises a body made of plastic material with a main bore 40 for slidingly receiving a chassis member. The clamp 26 is tightened by a fastener such as a bolt 42.

Figure 4:
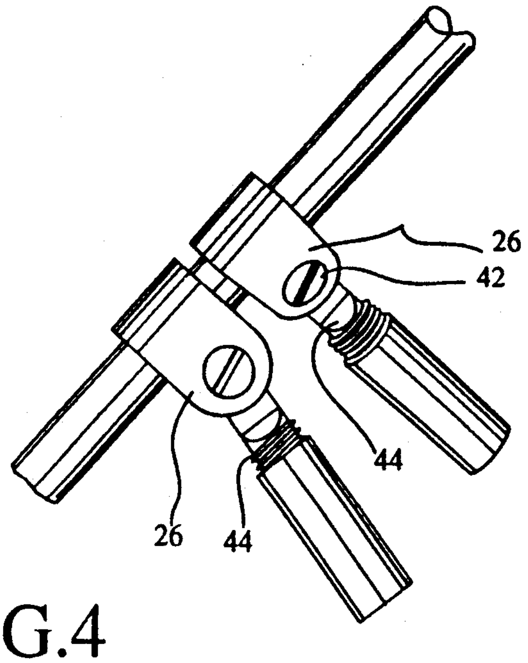
FIG. 4 is an enlarged perspective view illustrating a plurality of chassis members interconnected together by means of clamps as shown in FIG. 3.
Figure 5:
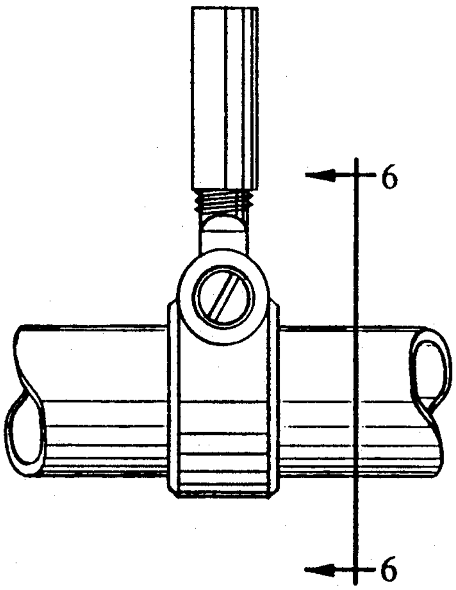
FIG. 5 is an enlarged elevational view illustrating two chassis members interconnected by the clamp shown in FIG. 3.
Figure 6:
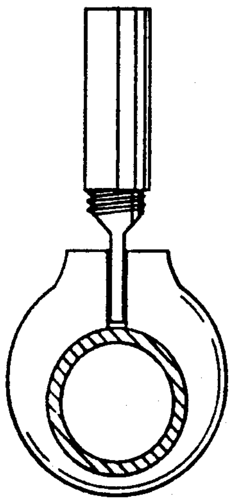
FIG. 6 is a cross-sectional view taken along lines 6—6 in FIG. 5.
Figure 7:
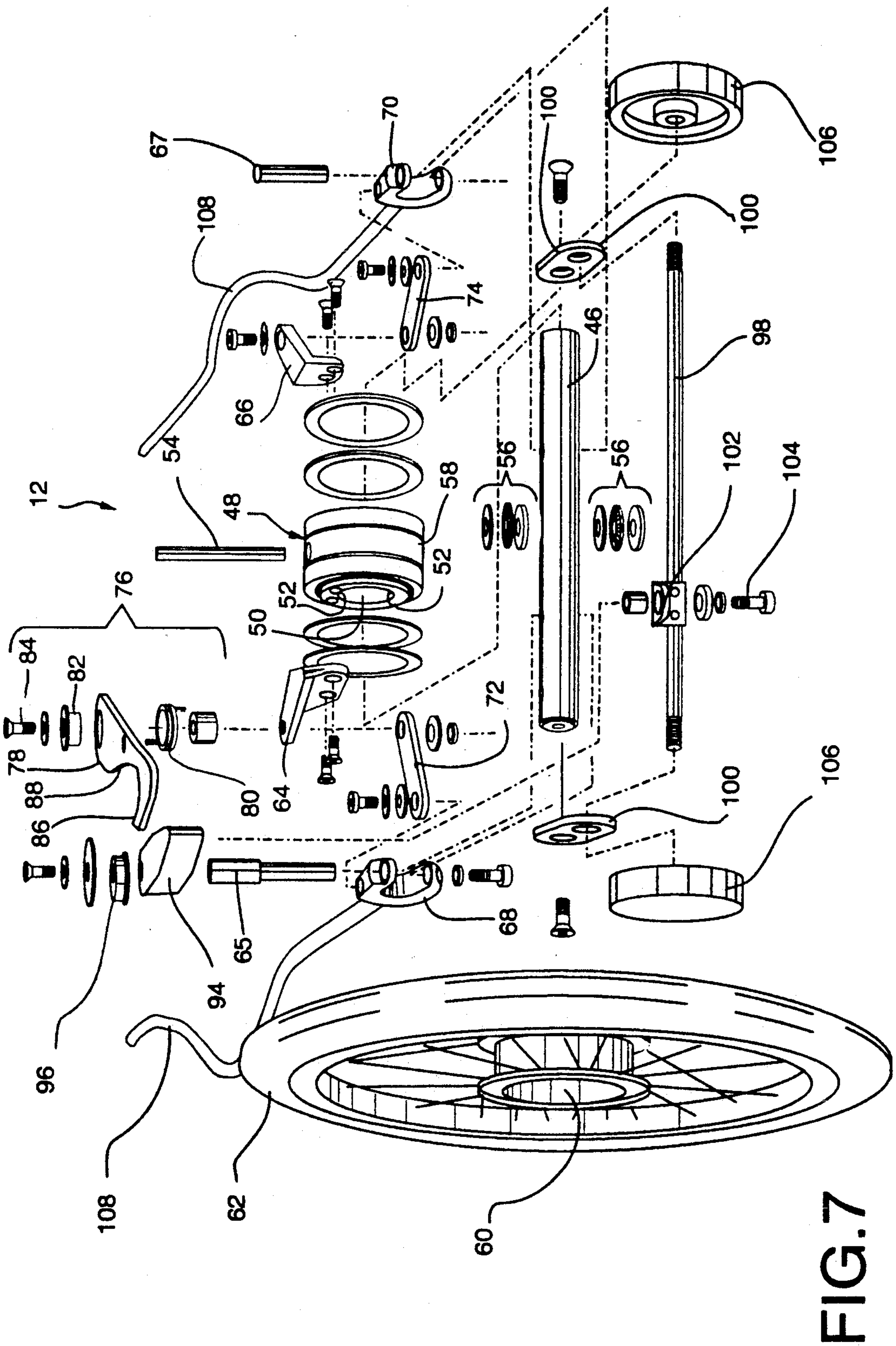
FIG. 7 is an exploded view of the front wheel assembly of the wheelchair.
Figure 8:
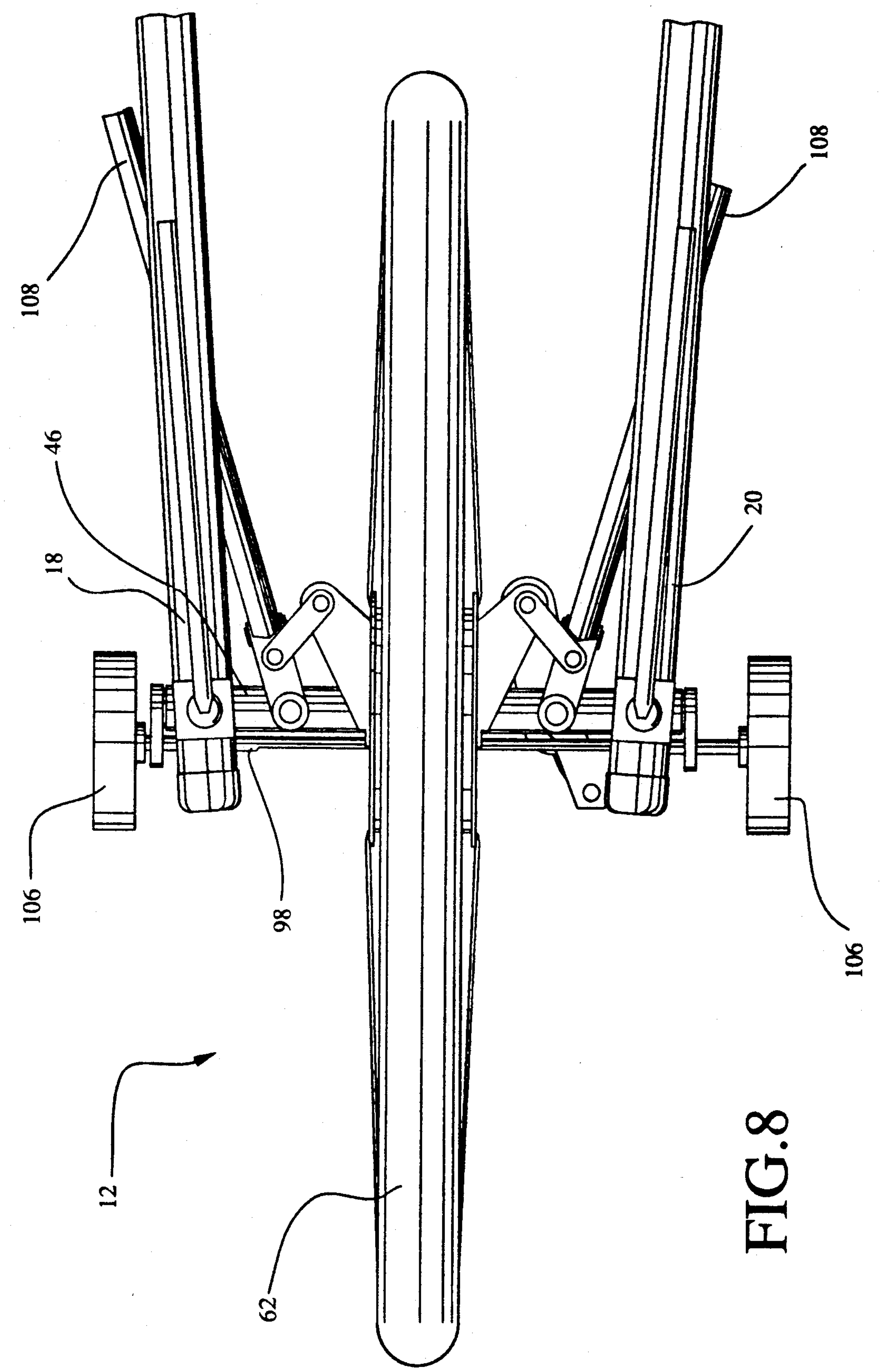
FIG. 8 is a top view of the front wheel assembly of the wheelchair.

FIGS. 4, 5 and 6 illustrate the connectors to join a chassis member to a clamp 26. The connector, designated by the reference numeral 44 comprises an elongated body treadedly received into a hollow chassis member, the body having at the opposite end a flattened portion with an opening to accomodate the bolt 42. This arrangement allows to carry out three different types of adjustments. When loosening the bolt 42, one may change the position of the clamp 26 on the chassis member received in the bore 40, adjust the angular position of the connector 44 with respect to the clamp 26 and also the length of the chassis member carrying the connector 44 may be adjusted by screwing or unscrewing the connector as required.

The chassis 12 in accordance with the invention is advantageous because it is relatively lightweight and, at the same time, is rigid. It is also adjustable to suit various driver body sizes. For example, in order to widen the driver compartment, one must release the clamps 26 between the various chassis members and to spread the beams 22 and 24 apart. When the desired position has been reached, the clamps 26 are tightened.

The front wheel assembly 14 will now be described in detail with relation to FIGS. 7 to 13.

The front wheel assembly 14 comprises a cross-member 46 in the form of metallic tubing mounted to the front extremities of the main rails 18 and 20 of the wheelchair chassis. An axle 48 comprising a main bore 50 with two horizontal flat surfaces 52 receives the cross-member 46 and is retained thereto by means of a pin 54 which allows the axle 48 to rotate with respect to the cross-member 46 about a vertical axis. Bearings 56 are mounted between the cross-member 46 and a respective flat surface 52 to reduce friction.

On the axle 48 is mounted a bearing 58 which receives the hub 60 of the front wheel 62, whereby the front wheel 62 may rotate on the axle 48.

Brackets 64 and 66 are mounted to the body of the axle 48 by means of suitable fasteners such as bolts. C-shaped blocks 68 and 70 are mounted to the cross-member 46 by vertical pivot pins 65 and 67 and are connected to the brackets 64 and 66 by means of respective links 72 and 74. It will be appreciated that links 72 and 74 are connected to the respective C-shaped block at a location spaced from the pivotal axis of the C-shaped block, whereby acting as a reduction linkage to reduce the amplitude movement of the axle 48 when moving the C-shaped blocks 68 and 70.

A cam assembly 76 comprising a cam member 78, a coil spring 80, a bearing 82 and a fastener 84 is mounted to the bracket 64. The cam member 78 comprises camming surfaces 86 and 88. It will be appreciated that the cam member 78 is free to pivot on the bracket 64 against the resiliency of the coil spring 80.

On the vertical pivot pin 65 is mounted a lever block 94 and a cam guide 96 in the form of a roller bearing. The cam guide 96 is mounted eccentric on the pivot pin 65, in other words the axes of these components do not coincide.

An elongated rod 98 is slidingly mounted in guide blocks 100 attached to the respective extremities of the cross-member 46. The rod 98 is pivotally mounted to the lever block 94 through a bracket 102 and a fastener 104. Each extremity of the rod 98 is treaded to receive a push-button 106.

To operate the front wheel assembly 12, steering handles 108 are mounted to the C-shaped blocks 68 and 70.

Figure 9:
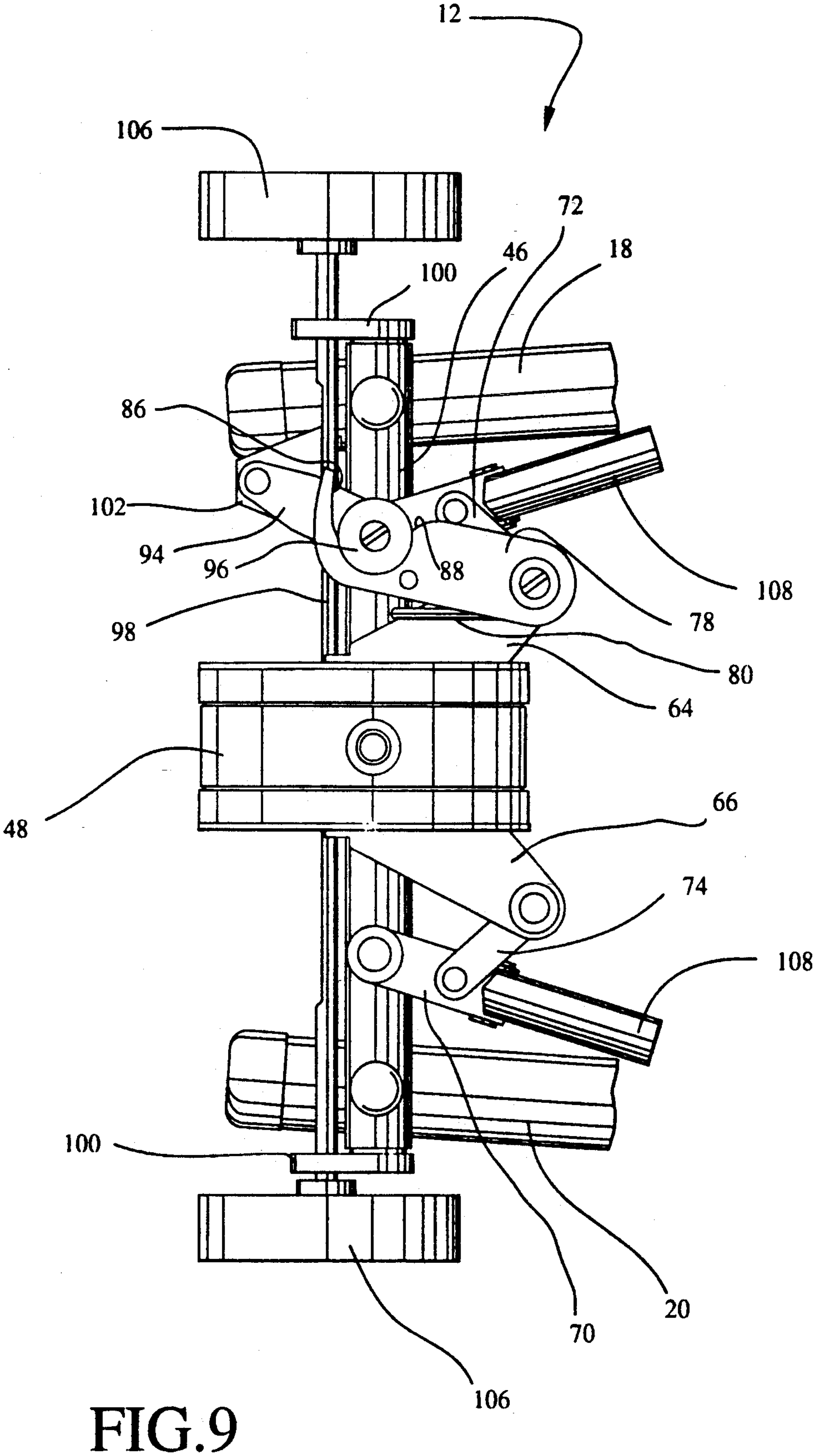
FIG. 9 is an enlarged view of the front wheel assembly, the wheel being omitted for clarification.

The operation of the front wheel assembly 12 will now be described with relation to FIGS. 8 to 13. When no effort is exerted on the steering handles 108, the axle 48 is generally perpendicular to the longitudinal axis of the cross-member 46. This position is best illustrated in FIG. 9.

Figure 10:
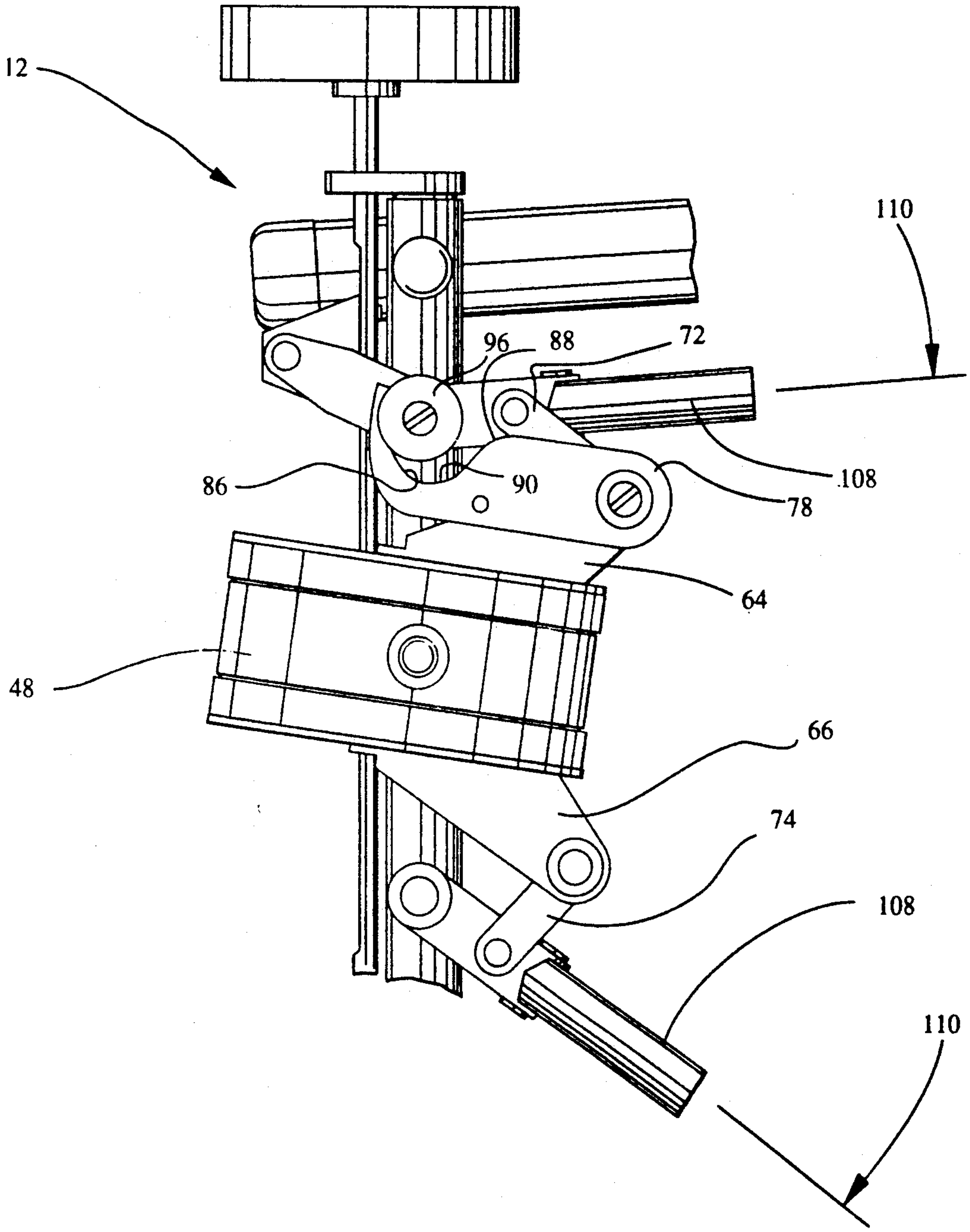
FIG. 10 is a partial view of the front wheel assembly illustrating the axle position set for a right turn.

When it is desired to set the front wheel assembly 12 for a right turn,, the steering handles 108 are turned in the direction shown by the arrow 110, as best illustrated in FIG. 10. This movement will be transmitted to the axle 48 through the links 72 and 74. The movement of the axle 48, will pivot the cam element 78 towards the axle 48 as a result of the rolling contact between the cam guide 96 and the camming surface 88, compressing the coil spring 80. If the steering handles 108 are released, the energy stored in the coil spring 80 will return the axle 48 to the dead centre position, namely when the cam guide 96 is locked between the cam surfaces 86 and 88.

Figure 11:
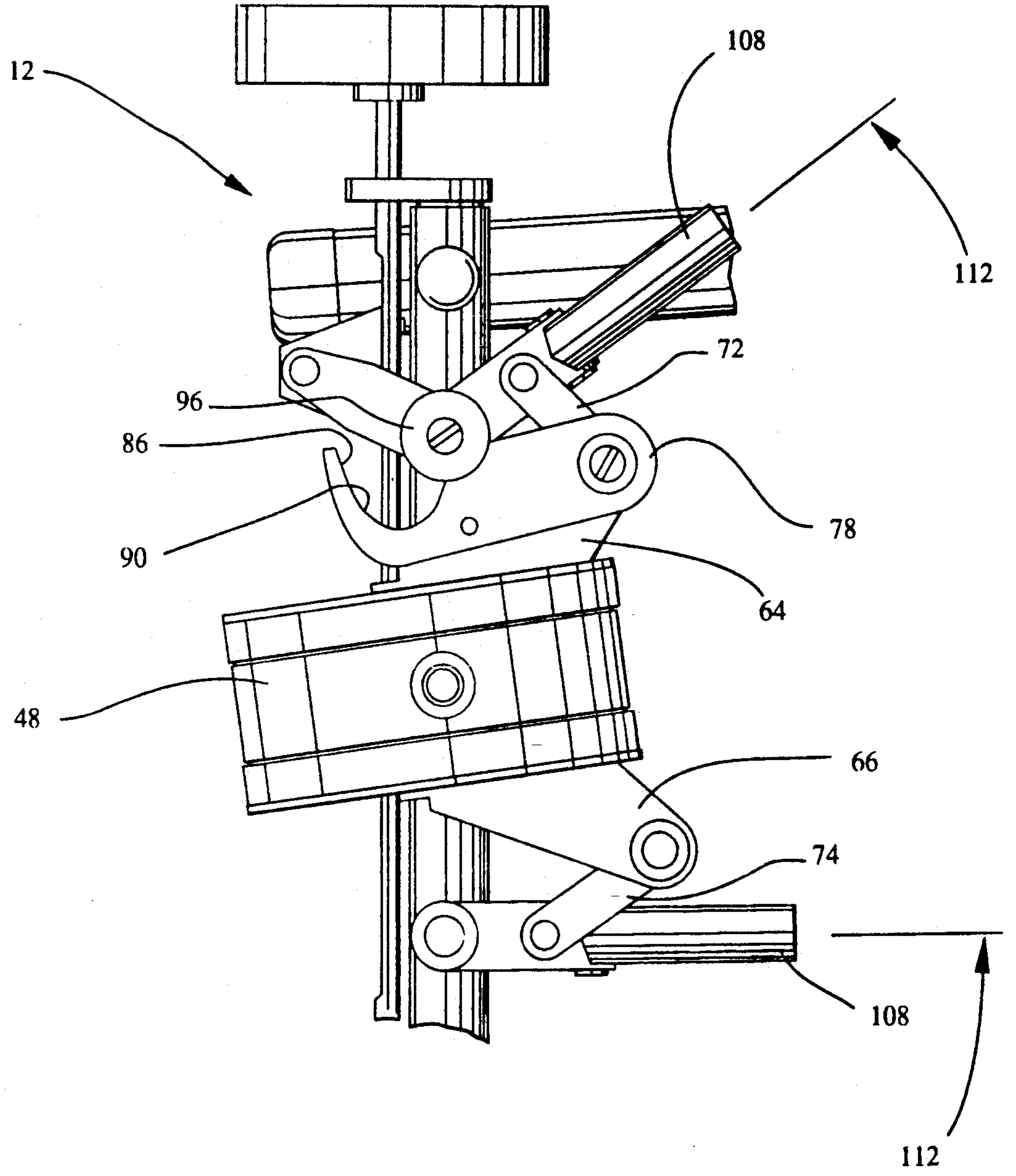
FIG. 11 is an enlarged partial view of the front wheel assembly illustrating the axle set for a left turn.

For a left turn, the steering handles 108 are pushed in the direction shown by the arrow 112, as best illustrated in FIG. 11. In this case, the cam guide 96 through a rolling with the camming surface 86 which will also have the effect of pivoting the camming element 78 towards the axle 48 to compress the spring 80. Accordingly, the spring 80 will urge the axle 48 toward the dead centre position.

Figure 12:
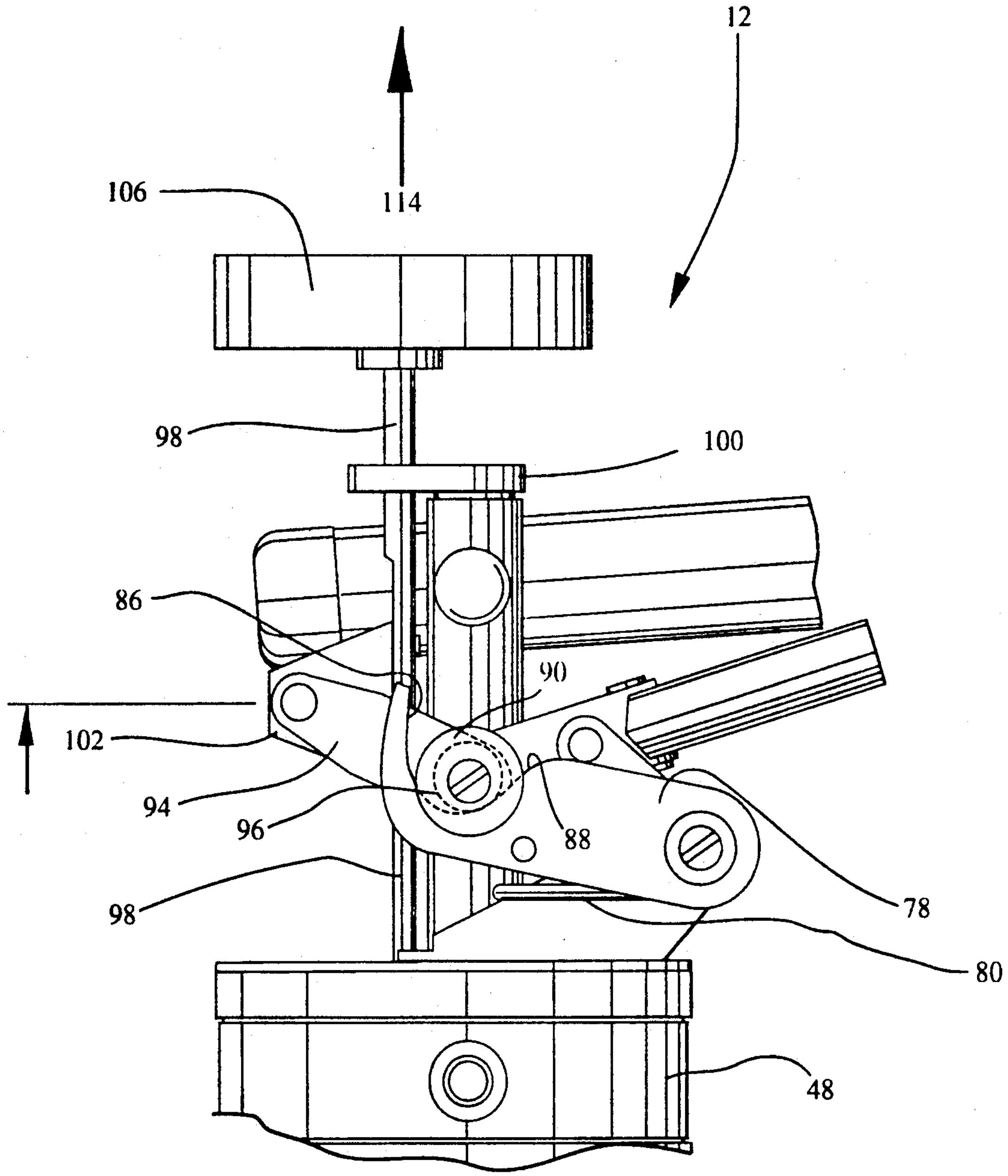
FIG. 12 is an enlarged partial view of the front wheel assembly illustrating the axle in the locked position.
Figure 13:
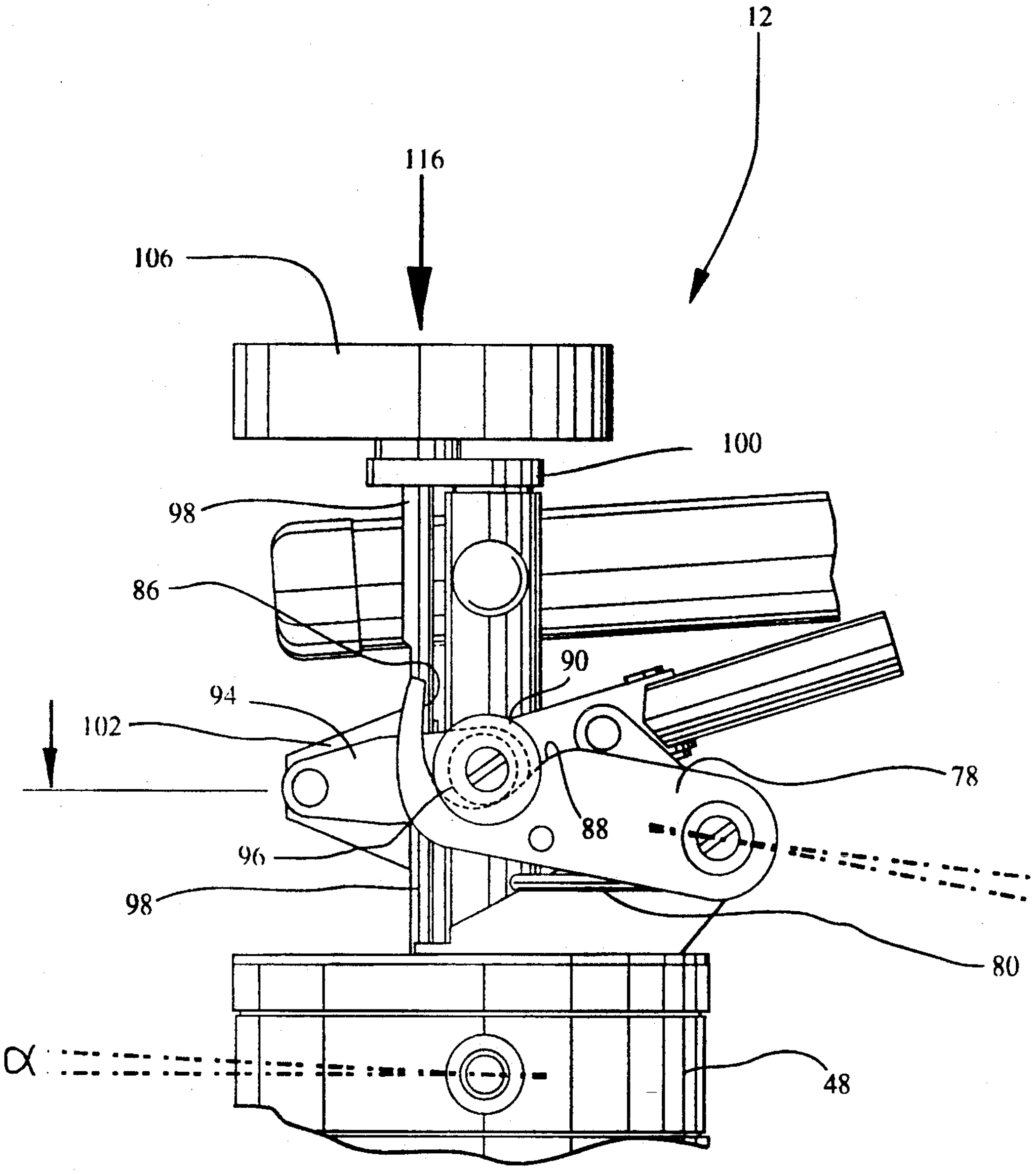
FIG. 13 is an enlarged partial view of the front wheel assembly illustrating the axle thereof set for a moderate left turn.

FIGS. 12 and 13 illustrate the operation of the mechanism constituted by the rod 98, the lever block 94 and the cam guide 96. When it is desired to keep the axle 48 in dead centre, as illustrated in FIG. 12, the push button 106 on the left side of the front wheel assembly 12 (not shown in FIG. 12) is pushed in the direction of the arrow 114 to abut against the guide 100. If desired to alter the position of the axle 48 by a small angle shown in FIG. 13 by $\alpha$ in order to set the front wheel assembly 12 for a moderate left turn, the rod 98 is actuated by pushing on the right push button 106 in the direction of the arrow 116. As a result, the pivot pin 96 will turn by virtue of the connection with the rod 98 through the lever block 94. Since the cam guide 96 is eccentric with respect to the pivot pin 65, the rotation of the pin 65 will cause the cam guide 96 to cam the cam member 78 toward the axle 48. This movement will compress the spring 80 and will slightly shift the position of the axle 48 to the left. It should be appreciated that during the movement of the cam guide 96, the latter remains locked between the surfaces 86 and 88.

Figure 14:
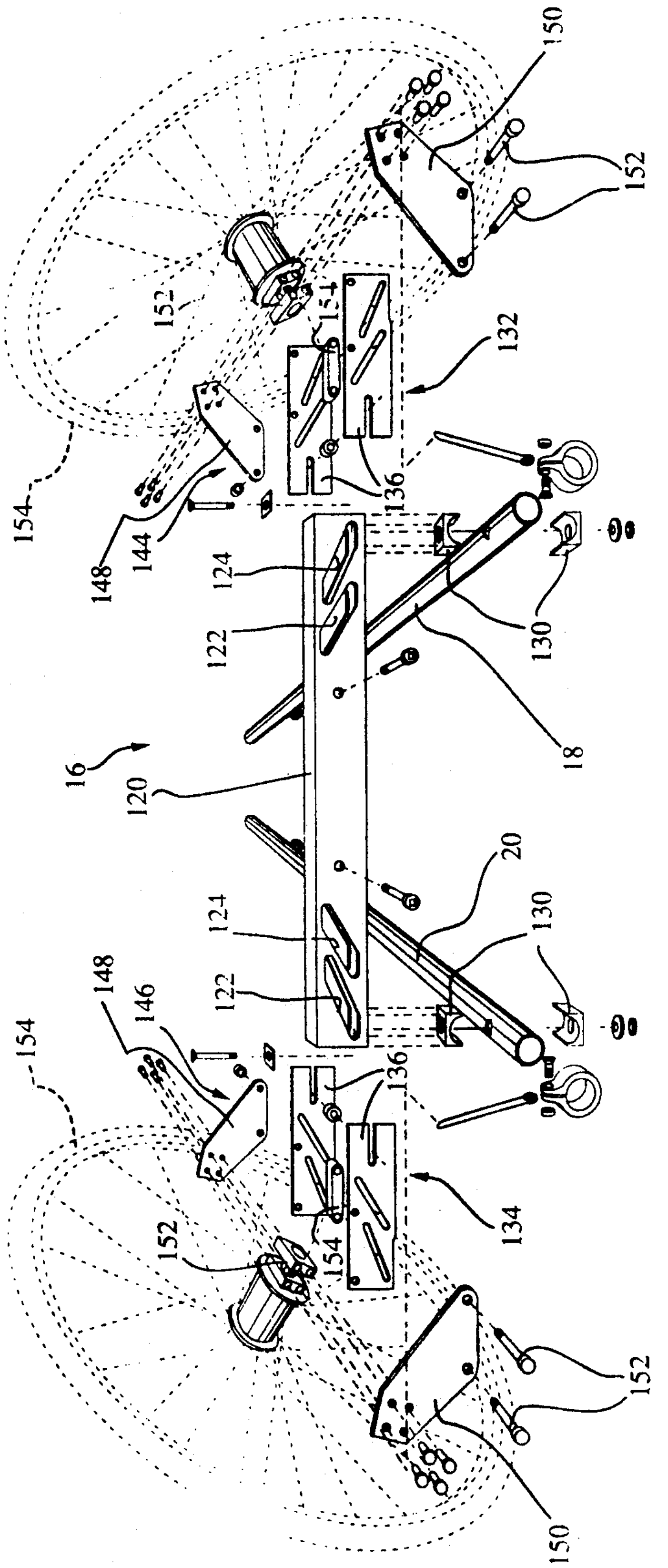
FIG. 14 is an exploded view of the rear axle assembly.
Figure 15:
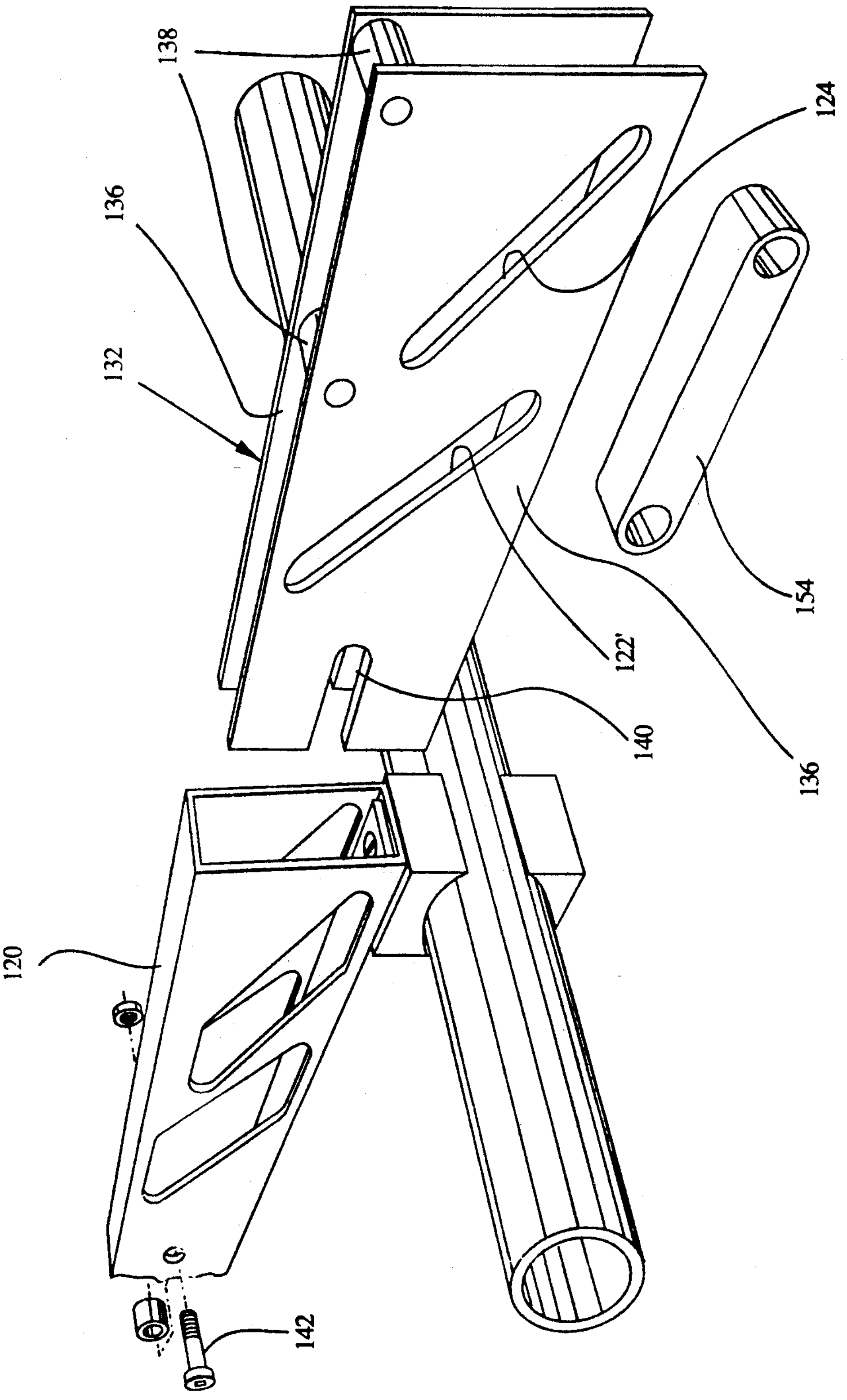
FIG. 15 is a perspective partial view of the rear axle assembly, the wheels being omitted for clarification.

FIG. 14 is an exploded view of the rear axle assembly 16.

The axle assembly 16 comprises a cross-member 120 in the form of a hollow rectangular-beam made preferably of aluminum in which are cut elongated guides 122 and 124. The cross-member 120 is mounted to the main rails 18 and 20 by means of suitable bearing blocks 130.

Sliding guide assemblies 132 and 134 are received in the cross-member 120, each comprising two plates 136 retained to each other in a spaced apart relationship by means of fasteners such as screws and suitable spacers 138. Guide slots 122' and 124' are cut in the plates 136, generally corresponding in orientation to the guides 122 and 124 on the cross-member 120 except that they are substantially narrower.

Figure 16:
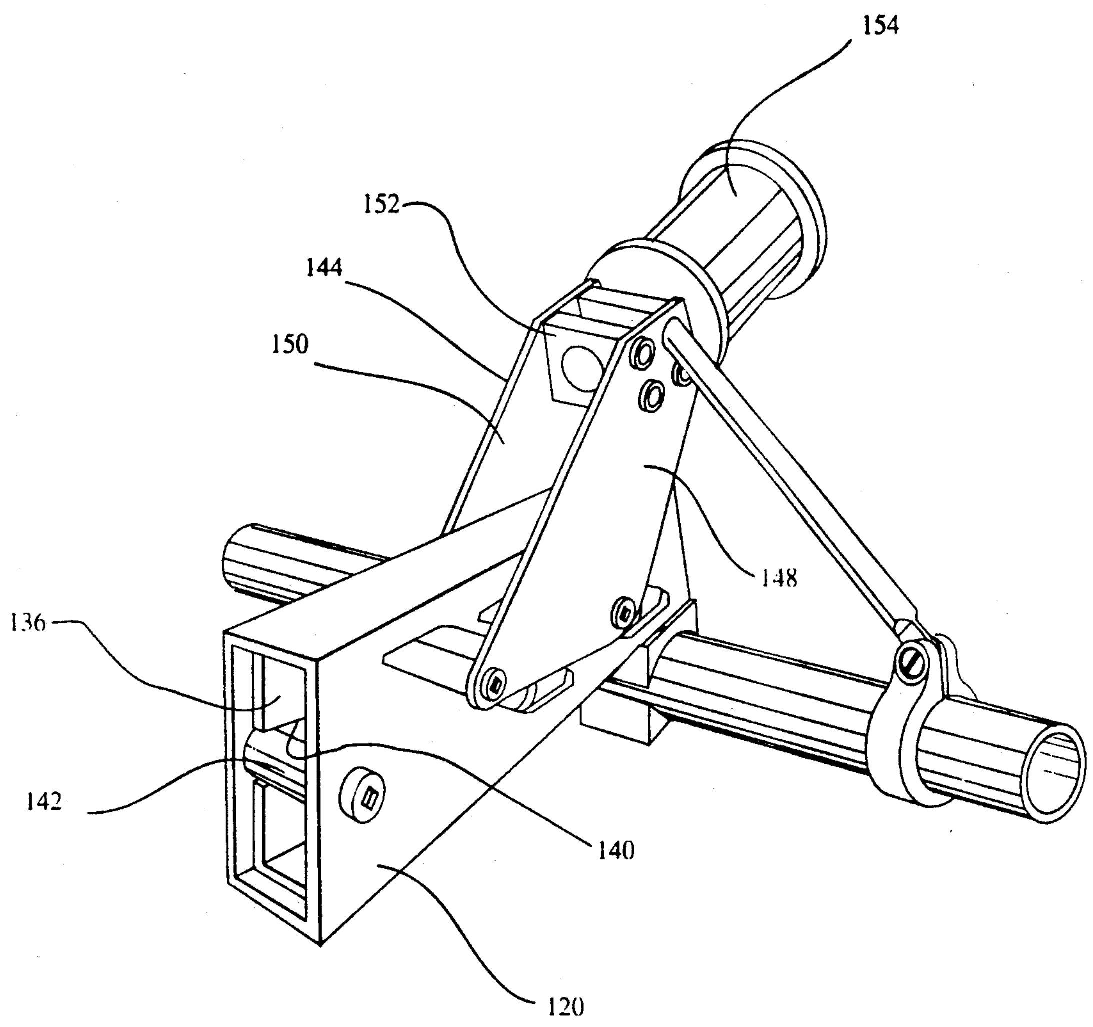
FIG. 16 is a perspective partial view of the rear axle assembly illustrating the articulation between a wheel and the rear cross-member.
Figure 17:
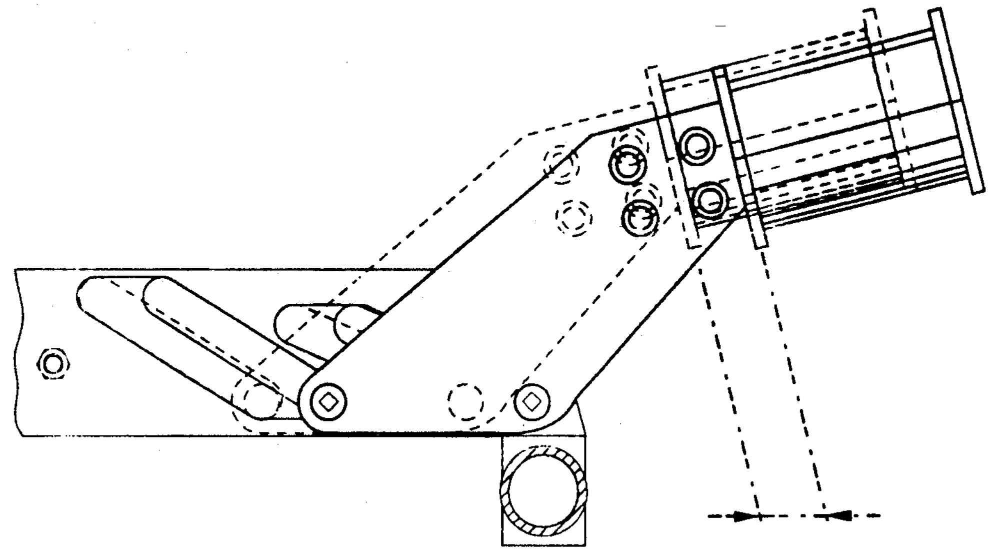
FIG. 17 is a partial elevational view of the articulation interconnecting the wheel to the rear cross-member illustrating the movement of the articulation in a horizontal axis.
Figure 18:
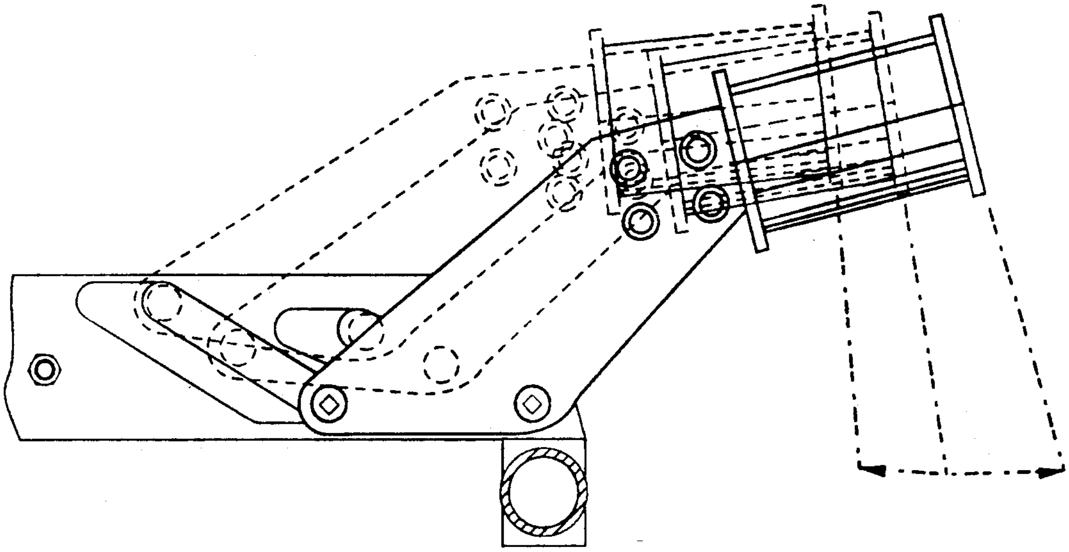
FIG. 18 is an enlarged partial elevational view of the articulation interconnecting a wheel to the rear cross-member showing possible positions of the articulation to adjust the camber of the wheel.

An additional guide slot 140 extending generally horizontally is provided on each plate 136. The slots 140 are adapted to accept a respective bolt 142 passing through the cross-member 120. This feature is best illustrated in FIG. 16.

Fork elements 144 and 146 are mounted to a respective sliding guide assembly 132 and 134. Each fork member comprises two generally parallel plates 148 and 150 respectively retained at their upper ends to an axle block 152 receiving the hub of a rear wheel 154. The lower extremities of the parallel plates 148 and 150 are drilled to accept bolts 152 passing through the guides 122 and 124 of the cross-member 120 and the guide slots 122' and 124' of the plates 136. One piece spacers 154 receiving the bolts 152 are mounted between the plates 136 to prevent deformation under compression.

Figure 19:
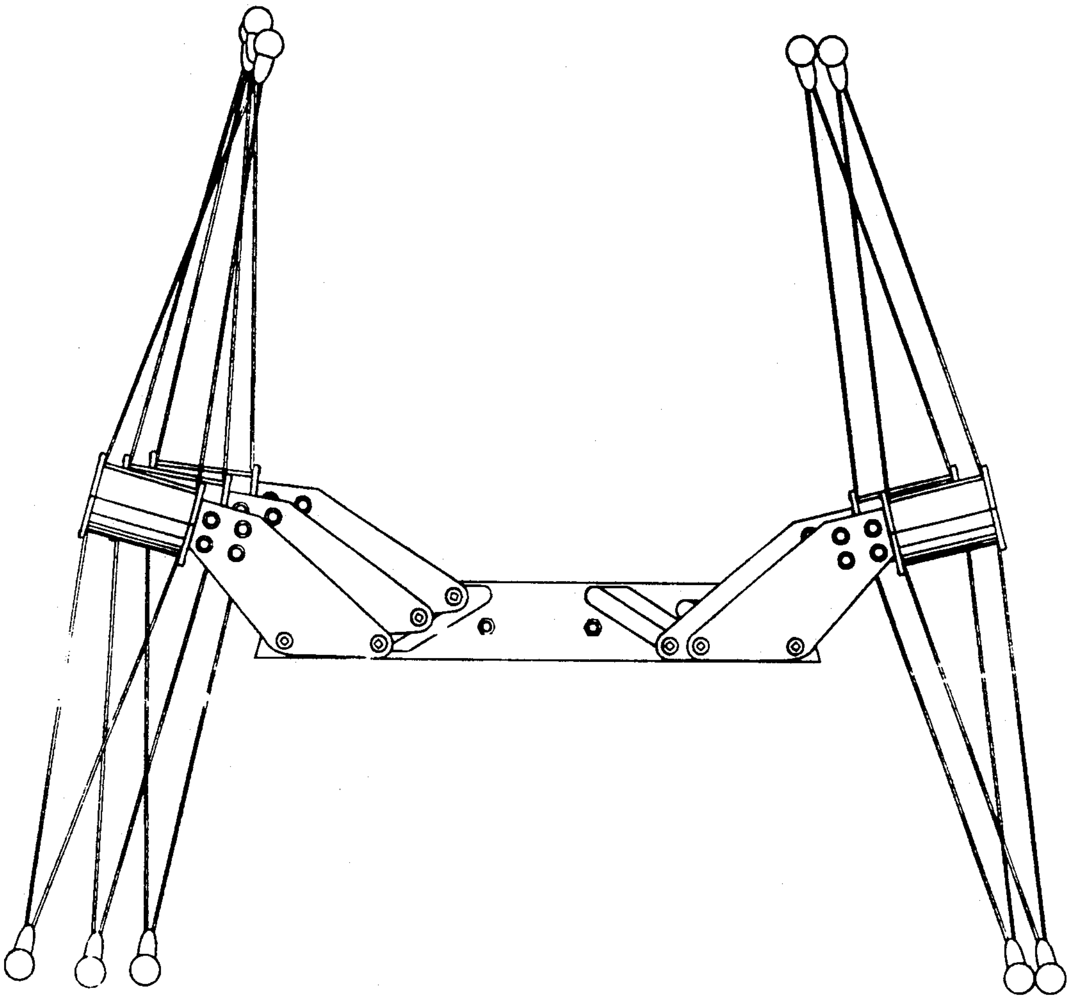
FIG. 19 is a schematical view of the rear axle assembly illustrating schematically possible adjustments.

The rear axle assembly 16 allows to make the following adjustments. If desired to extend or to retract the wheels 154 with respect to the chassis 12, it suffices to loosen the bolts 142 so as to slide the guide assemblies 132 and 134 in the cross-member 120. The absence of free-play between the sliding guide assemblies 132 and 134, and the cross-member 120 allows to obtain a purely translational motion during that adjustment so that the camber of the wheels is not changed in any way. This feature is illustrated in FIG. 19, the right wheel being shown in various positions. The adjustment range is defined by the width of the guides 122 and 124. When the desired position of the wheels 154 has been achieved, it suffices to tighten the locking bolts 142. It should be observed that the above adjustment may be performed independantly to one wheel with respect to the other.

When it is desired to vary the camber of a wheel 154, it suffices to loosen the bolt 152 so as to allow a relative movement between the guide assemblies 132 and 134 and the fork members 144 and 146 respectively. The shape of the guide slots 122' and 124' is critical to the invention since it is desired to allow a camber change without varying the ride height of the rear axle assembly 16 nor the horizontal position of the top portion of the wheel. Stated otherwise, as the camber changes, the lower extremity of the wheels 154 should follow a horizontal straight line and the top portion follows a vertical straight line. This feature is particularly well illustrated in FIG. 19 in which the left wheel is shown in various positions corresponding to camber angles of 6°, 10° and 14°. It will be appreciated that when moving from one position to another, the lower extremity of the wheel 154 follows a horizontal line and the top extremity follows a vertical line.

Changing the camber of the wheel without varying the ride height nor spacing between the rear wheels is a particularly advantageous feature because this adjustment becomes transparent with relation to the other settings of the wheelchair. In other words, changing the camber does not require readjusting the toe in for example. In addition, this characteristic allows to have different camber angles for the left and the right wheels of the wheelchair, yet maintaining the rear axle assembly perfectly horizontal with the ground surface.

The shape of the guides 122' and 124' allowing this complex movement of the fork assemblies 144 and 146 may be determined mathematically which is very complex or it may also be determined by a simple practical method. For this purpose, it suffices to fix the rear axle 120 so it does not move, to place a fork assembly in overlapping relationship therewith and to move the lower end of the wheel mounted to the fork assembly along a straight guide that is parallel to the longitudinal axis of the cross-member 120 and move the top portion of the wheel along a straight vertical guide. This movement should be performed while maintaining at all times the fork assembly 144 in overlapping relationship with the cross-member. The path followed by the fork assembly will determine the shape of the guide slots 122' and 124'.

I claim:

1. A combination for use with a vehicle, comprising:

a cross-member extending generally transversely with relation to a longitudinal axis of the vehicle;

a wheel assembly, including:

a) an axle member pivotally mounted to said cross-member; and b) a wheel rotatably supporting the vehicle on a ground surface, said wheel being rotatably mounted to said axle member, a pivotal movement of the axle member allowing to vary the angular relationship between the wheel assembly and the cross-member in order to steer the vehicle;

wheel assembly return means cooperating with said wheel assembly for urging the latter toward a predetermined angular position with respect to said cross-member, wherein said wheel assembly return means is operatively mounted between said axle member and said cross-member and comprises:

a cam;

a cam engaging member coupled to said cam, a pivotal movement of said axle member on said cross-member causing a relative displacement between said cam and said cam engaging member;

a resilient member coupled to one of said cam and cam engaging member, said relative displacement causing said one of said cam and cam engaging member to yield against a resiliency of said resilient member.

2. A combination as defined in claim 1, wherein said return means comprises a resilient member which is deformed when said wheel deviates from said predetermined angular position.

3. A wheel assembly as defined in claim 1, comprising an actuator means coupled to said axle member to pivot said axle member with respect to said cross-member in response to a steering input applied to said actuator means in order to vary the angular position between said wheel and said cross-member.

4. A wheel assembly as defined in claim 3, wherein said actuator includes a lever pivotally mounted to said cross-member, and linkage means connecting said lever to said axle member.

5. A wheel assembly as defined in claim 4, wherein said linkage means includes a resilient element urging said linkage means towards a neutral position in which said wheel is in said predetermined angular position with respect to said cross-member.

6. A combination as defined in claim 1, wherein said cam comprises first and second camming surfaces, said cam engaging member engaging either one of said camming surfaces according to a direction of movement of said wheel assembly from said predetermined angular position.

7. A combination as defined in claim 6, wherein said cam engaging member is positioned between said camming surfaces when said wheel assembly is in said predetermined angular position.

8. A combination as defined in claim 1, wherein said cam is coupled to a spring and causes a deformation of said spring as a result of a relative displacement between said cam and said cam engaging member.

9. A combination as defined in claim 8, wherein said cam is pivotally mounted to said wheel assembly.

10. A combination as defined in claim 9, wherein said cam engaging member is mounted to said cross-member.

11. A combination as defined in claim 10, comprising means to displace said cam engaging member toward said cam to cause a controlled angular displacement of said wheel from said predetermined angular position.

12. A combination as defined in claim 11, wherein said cam engaging member comprises a circular member pivotally mounted to a shaft, said shaft being pivotally mounted to said cross-member, respective pivotal axes of said circular member and of said shaft being non-coinciding, whereby said cam engaging member causes said cam to yield as a result of a pivotal movement of said shaft.

13. A combination as defined in claim 12, comprising an actuator rod slidingly mounted to said cross-member and coupled to said shaft to cause a pivotal movement of said shaft when sliding along said cross-member.

14. A wheelchair comprising:

a frame, said frame including a cross-member at a front end thereof which is generally transversal to a longitudinal axis of said wheelchair;

a front wheel assembly, including:

a) an axle member receiving said cross-member and being pivotally mounted thereto;

b) a wheel for rotatably supporting said wheelchair on a ground surface, said wheel being rotatably mounted to said axle member, a pivotal movement of said axle member allowing to vary the angular relationship between said wheel assembly and said cross-member;

wheel assembly return means cooperating with said wheel assembly for urging the latter toward a predetermined angular position with respect to said cross-member, wherein said wheel assembly return means is operatively mounted between said axle member and said cross-member and comprises:

a cam;

a cam engaging member coupled to said cam, a pivotal movement of said axle member on said cross-member causing a relative displacement between said cam and said cam engaging member;

a resilient member coupled to one of said cam and cam engaging member, said relative displacement causing said one of said cam and cam engaging member to yield against a resiliency of said resilient member.

* * * * *

UNITED STATES PATENT AND TRADEMARK OFFICE
CERTIFICATE OF CORRECTION

PATENT NO. : 5,259,635

DATED : November 9, 1993

INVENTOR(S) : PICKER, Patrick

It is certified that error appears in the above—identified patent and that said Letters Patent is hereby corrected as shown below:

On the title page, item [73], Assignee: delete the following:
--Sherwood Drolet Corporation Ltd, Canada--

Signed and Sealed this

Twenty-seventh Day of September, 1994

Attest:

BRUCE LEHMAN

*Attesting Officer* *Commissioner of Patents and Trademarks*